UNITED STATES PATENT OFFICE.

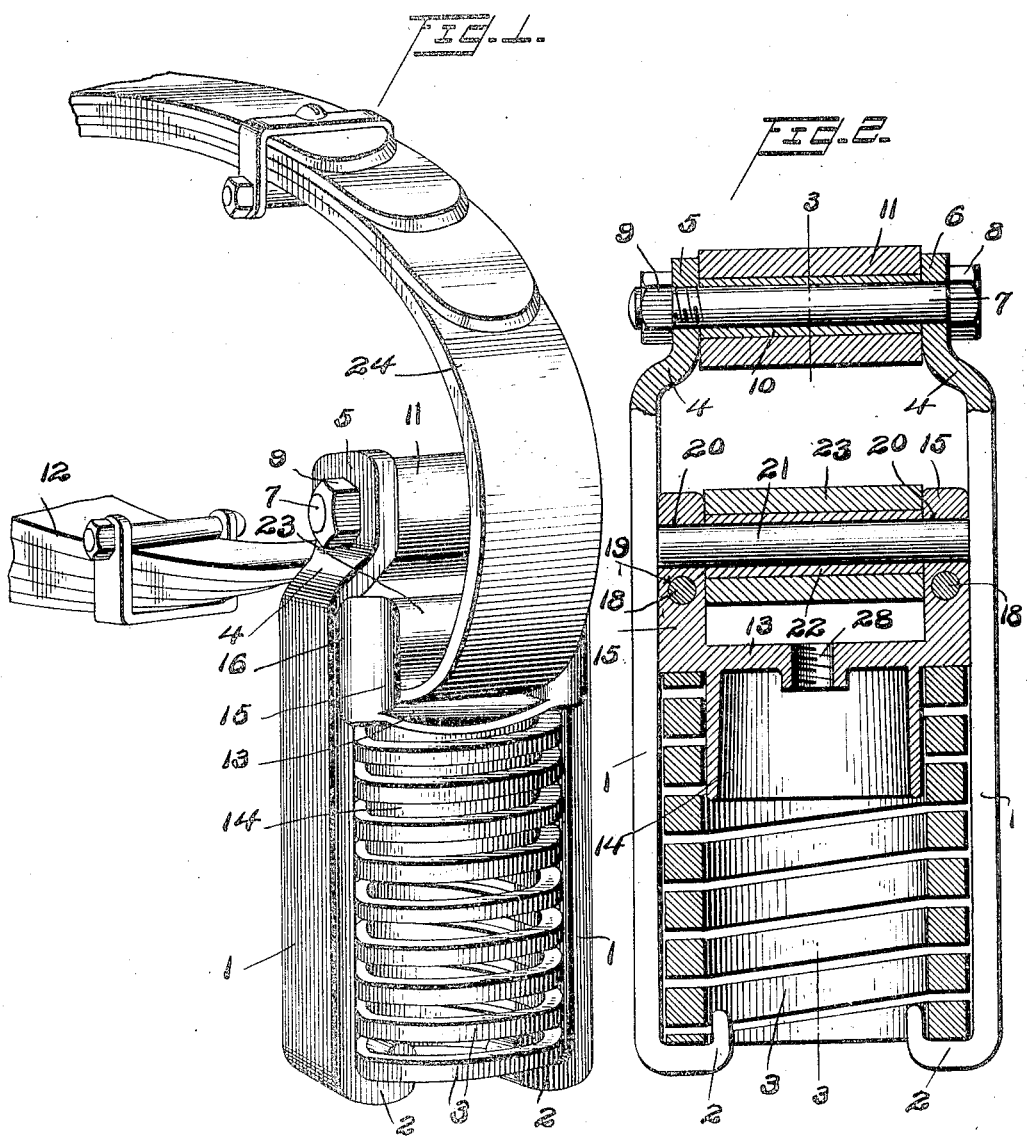

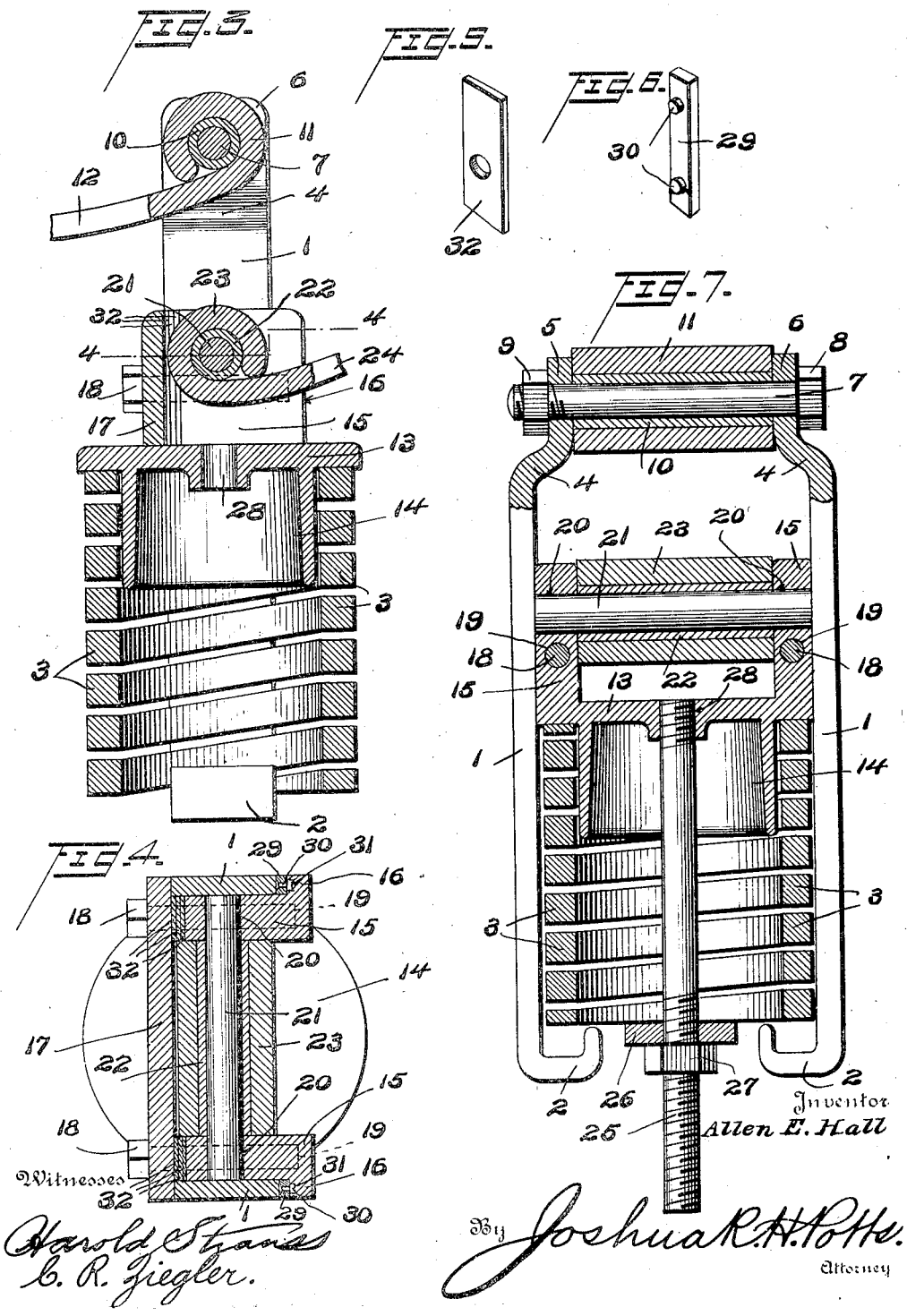

ALLEN EVERT HALL, OF PHILADELPHIA, PENNSYLVANIA.

SHOCK-ABSORBER.

1,101,696.

Specification of Letters Patent.  Patented June 30, 1914.

Application filed October 7, 1913. Serial No. 793,820.

*To all whom it may concern:*

Be it known that I, ALLEN E. HALL, a citizen of the United States, residing at Philadelphia, in the county of Philadelphia and State of Pennsylvania, have invented certain new and useful Improvements in Shock-Absorbers, of which the following is a specification.

My invention relates to improvements in shock absorbers, an object of the invention being to provide a shock absorber which consists of a relatively few, strong and durable parts which may be attached to any ordinary automobile or similar vehicle, and which will most efficiently absorb shocks and vibrations.

A further object is to provide a shock absorber which embodies in its construction a head supported upon the upper end of a coiled spring and movable between links, the lower ends of the latter of general hook shape engaging the lower end of the coiled spring, and the upper ends of said links connected to one part, while the head is connected to another part, whereby the spring operates to cushion the connection between the two parts.

A further object is to improve upon the construction set forth in my application for patent on shock absorbers filed June 24, 1913, and given Serial No. 775,453.

With these and other objects in view, the invention consists in certain novel features of construction and combinations and arrangements of parts as will be more fully hereinafter described and pointed out in the claims.

In the accompanying drawings: Figure 1 is a perspective view illustrating my improvements. Fig. 2 is a view in longitudinal section. Fig. 3 is a view in longitudinal section at right angles to Fig. 2, taken on the line 3—3 of Fig. 2. Fig. 4 is a view in transverse section on the line 4—4 of Fig. 3. Figs. 5 and 6 are views of details of construction, and Fig. 7 is a view similar to Fig. 2, but illustrating the manner of assembling the parts as my improved shock absorber is positioned on a vehicle.

1, 1 represent parallel vertically disposed links having inwardly projecting hooks 2 at their lower ends supporting the lower end of a coiled spring 3. The upper ends of the links 1 are curved or bent inwardly as shown at 4, and then extend upwardly forming parallel perforated ears 5 and 6 respectively. The opening or perforation in ear 5 is screw-threaded and a bolt 7 is positioned through the ear 6 and screwed through the ear 5 and is provided with a head 8 against ear 6, and a nut 9 against ear 5, so that the bolt is securely held against turning movement. A sleeve 10 is located around bolt 7, and around this sleeve 10, the eye 11 of a spring 12 is positioned.

A circular head 13 is supported upon the upper end of spring 3, and is provided on its lower face with a cylindrical extension 14 located within the coiled spring and assisting in holding the parts in proper operative relationship. The head 13 is provided at opposite sides with upwardly projecting integral lugs 15, said lugs at one edge having laterally projecting enlargements constituting strongly reinforced flanges 16 which bear against the edges of the links 1. While I refer to the flanges 16 as bearing against the links, as a matter of fact I provide wearing plates 29 which have studs 30 riveted therein and located in sockets 31 in the flanges. The studs therefore hold the wearing plates against movement, but permit the wearing plates to be removed and replaced when worn.

A transversely positioned plate 17 is secured to the lugs 15 by means of bolts 18 which are projected through openings in the plate 17 and screwed into threaded sockets 19 in the lugs. The plate 17 is of a length equal to the combined width of the device, so that said plate coöperates with the flanges 16 to form guides for the movement of the links 1 at opposite sides of the head or vice versa, so that the parts are maintained in relative position by the flanges 16 and the plate 17. Between the lugs 15 and plate 17, I locate a plurality of shives 32 perforated to receive the bolts 18, and when the parts wear, certain of these shives may be removed to take up such wear and insure a proper engagement at all times. The lugs 15 are formed with registering openings 20 in which a pin 21 is located, longitudinal movement of the pin being prevented by the links 1 against which the ends of the pin bear as shown clearly in Fig. 2. On the pin 21, a sleeve 22 is located, and around this sleeve an eye 23 on the end of a scroll 24 is located, so that the spring 3 will operate to absorb shocks and vibrations between the scroll and the spring as will be readily understood. The upward movement of the head 13 is limited by the bends 4 in the links 1, as the lugs 15 will strike these bends upon an extreme movement of the head.

To assemble the device, I utilize a threaded rod 25, a transverse bar 26, and a nut 27 as shown most clearly in Fig. 7. The screw-threaded rod 25 is screwed into a threaded opening 28 in the center of head 13. The bar 26 has a central opening to receive the rod, and is positioned transversely of and bears against the lower end of spring 3. The nut 27 is screwed onto the rod 25, and as it moves the bar 26 upwardly, the latter will contract the coiled spring, so that the links 1, 1, may have their hooked ends 2 positioned under the coiled spring, and the parts may be connected to the scroll 24 and the spring 12 respectively. Nut 27 is then unscrewed to permit the coiled spring 3 to move downwardly into the hooked ends 2, and then the rod 25 is removed and the device is ready for use.

To vary the tension of the spring in accordance with the vehicle on which the shock absorber is used, I provide links 1 of various lengths and by the use of the proper length of link in accordance with the load to be sustained, the proper distance between the hanger and the head is also maintained, so that the vehicle will be carried at the proper height.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A shock absorber comprising parallel links adapted to be connected to a support, inwardly projecting devices at the lower ends of the links, a coiled spring located between the links and supported by said devices, and a head supported on the upper end of said spring, substantially as described.

2. A shock absorber comprising parallel links adapted at their upper ends to be connected to a support, and having inwardly projecting hook shaped lower ends, a coiled spring located between the links and supported on the hook shaped lower ends thereof, and a head supported on the upper end of said coiled spring, substantially as described.

3. A shock absorber comprising parallel links adapted at their upper ends to be connected to a support, and having inwardly projecting hook shaped lower ends, a coiled spring located between the links and supported on the hook shaped lower ends thereof, said hook shaped ends projecting up inside of the lower convolution of the coiled spring, a head supported on the upper end of said coiled spring and having guides at opposite sides thereof in which the links are located, substantially as described.

4. A shock absorber comprising parallel links adapted at their upper ends to be connected to a support, and having inwardly projecting hook shaped lower ends, a coiled spring located between the links and supported on the hook shaped lower ends thereof, a head supported on the upper end of said coiled spring, upwardly projecting lugs on said head having flanges projecting outwardly against the edges of the links, and a plate secured to said lugs and bearing against the opposite edges of said links, substantially as described.

5. A shock absorber comprising parallel links adapted at their upper ends to be connected to a support, and having inwardly projecting hook shaped lower ends, a coiled spring located between the links and supported on the hook shaped lower ends thereof, a head supported on the upper end of said coiled spring, upwardly projecting lugs on the head having laterally projecting flanges at one edge, a plate secured to the edges of said lugs and coöperating with the flanges to form guides for the links, and bolts securing the plate to the lugs and having a plurality of shives thereon between the plate and the lugs, substantially as described.

6. A shock absorber comprising a pair of independent parallel links adapted to be connected to a support, a coiled spring located between and supported at its lower end by inwardly bent ends on said links, a head supported on said spring, and said links having inwardly bent portions constituting stops limiting the upward movement of the head, substantially as described.

7. A shock absorber comprising parallel links adapted at their upper ends to be connected to a support, and having inwardly projecting hook shaped lower ends, a coiled spring located between the links and supported on the hook shaped lower ends thereof, said hook shaped ends projecting up inside of the lower convolution of the coiled spring, a head supported on the upper end of said coiled spring, and said links having inwardly bent portions constituting stops limiting the upward movement of the head, substantially as described.

8. A shock absorber comprising parallel links adapted at their upper ends to be connected to a support, and having inwardly projecting hook shaped lower ends, a coiled spring located between the links and supported on the hook shaped lower ends thereof, said hook shaped ends projecting up inside of the lower convolution of the coiled spring, a head supported on the upper end of said coiled spring and having guides at opposite sides thereof in which the links are located, and said links having inwardly bent portions constituting stops limiting the upward movement of the head, substantially as described.

9. A shock absorber comprising parallel links adapted at their upper ends to be connected to a support, and having inwardly projecting hook shaped lower ends, a coiled spring located between the links and supported on the hook shaped lower ends thereof, a head supported on the upper end of said coiled spring, upwardly projecting lugs on said head having flanges projecting outwardly against the edges of the links, a plate secured to said lugs and bearing against the opposite edges of said links, and said links having inwardly bent portions constituting stops limiting the upward movement of the head, substantially as described.

10. A shock absorber comprising parallel links adapted at their upper ends to be connected to a support, and having inwardly projecting hook shaped lower ends, a coiled spring located between the links and supported on the hook shaped lower ends thereof, a head supported on the upper end of said coiled spring, upwardly projecting lugs on the head having laterally projecting flanges at one edge, a plate secured to the edges of said lugs and coöperating with the flanges to form guides for the links, bolts securing the plate to the lugs and having a plurality of shives thereon between the plate and the lugs, and said links having inwardly bent portions constituting stops limiting the upward movement of the head, substantially as described.

11. A shock absorber comprising parallel links adapted at their upper ends to be connected to a support, and having inwardly projecting hook shaped lower ends, a coiled spring located between the links and supported on the hook shaped lower ends thereof, said hook shaped ends projecting up inside of the lower convolution of the coiled spring, a head supported on the upper end of said coiled spring and having guides at opposite sides thereof in which the links are located, said lugs having alined openings therein, and a pin positioned in said openings, said links located at opposite ends of the pin and limiting longitudinal movement thereof, substantially as described.

12. A shock absorber comprising parallel links adapted at their upper ends to be connected to a support, and having inwardly projecting hook shaped lower ends, a coiled spring located between the links and supported on the hook shaped lower ends thereof, a head supported on the upper end of said coiled spring, upwardly projecting lugs on said head having flanges projecting outwardly against the edges of the links, a plate secured to said lugs and bearing against the opposite edges of said links, said lugs having alined openings therein, and a pin positioned in said openings, said links located at opposite ends of the pin and limiting longitudinal movement thereof, substantially as described.

13. A shock absorber comprising parallel links adapted at their upper ends to be connected to a support, and having inwardly projecting hook shaped lower ends, a coiled spring located between the links and supported on the hook shaped lower ends thereof, a head supported on the upper end of said coiled spring, upwardly projecting lugs on the head having laterally projecting flanges at one edge, a plate secured to the edges of said lugs and coöperating with the flanges to form guides for the links, bolts securing the plate to the lugs and having a plurality of shives thereon between the plate and the lugs, said lugs having alined openings therein, and a pin positioned in said openings, said links located at opposite ends of the pin and limiting the longitudinal movement thereof, substantially as described.

14. A shock absorber comprising parallel links having hook shaped lower ends, a bolt projected through the upper end of one of said links and having screw-threaded engagement with the other of said links, a coiled spring supported on the hook shaped lower ends of the links, said hook shaped ends projecting upwardly within the lowest convolution of the coiled spring, a head mounted on the upper end of the spring and having guides at opposite sides thereof in which the links are movable, and a pin supported by said head and prevented from longitudinal movement by the engagement with the links, substantially as described.

15. A shock absorber comprising parallel links having hook shaped lower ends, a coiled spring located between the links and supported on the hook shaped lower ends thereof, a head on the upper end of said spring, said head having a threaded opening for the reception of a rod, and the latter having means thereon for compressing the spring, substantially as described.

16. A shock absorber comprising parallel links having hook shaped lower ends, a coiled spring supported on the hook shaped lower ends of said links, a head supported on the upper end of said coiled spring and having laterally projecting flanges, a plate secured to the head and coöperating with the flanges to form guides for the links, said flanges having sockets in their inner faces, and wearing plates located between the links and the flanges and having studs positioned in said sockets, substantially as described.

In testimony whereof I have signed my name to this specification in the presence of two subscribing witnesses.

ALLEN EVERT HALL.

Witnesses:
M. E. DITTUS,
CHAS. E. POTTS.